United States Patent
Balboni

(10) Patent No.: US 8,851,489 B2
(45) Date of Patent: Oct. 7, 2014

(54) STEERING SYSTEM FOR MOTOR VEHICLES, IN PARTICULAR FOR AGRICULTURAL MACHINES

(75) Inventor: Gabriele Balboni, San Felice Sul Panaro (IT)

(73) Assignee: CNH Industrial America LLC, New Holland, PA (US)

( * ) Notice: Subject to any disclaimer, the term of this patent is extended or adjusted under 35 U.S.C. 154(b) by 86 days.

(21) Appl. No.: 13/701,352

(22) PCT Filed: May 31, 2011

(86) PCT No.: PCT/EP2011/058946
§ 371 (c)(1),
(2), (4) Date: Mar. 21, 2013

(87) PCT Pub. No.: WO2011/151324
PCT Pub. Date: Dec. 8, 2011

(65) Prior Publication Data
US 2013/0193658 A1    Aug. 1, 2013

(30) Foreign Application Priority Data
Jun. 3, 2010 (IT) .............................. BO2010A0345

(51) Int. Cl.
| B62D 7/06 | (2006.01) |
| B60G 9/02 | (2006.01) |
| B62D 9/00 | (2006.01) |
| B62D 9/02 | (2006.01) |

(52) U.S. Cl.
CPC .. B62D 7/06 (2013.01); B60G 9/02 (2013.01); B62D 9/00 (2013.01); B60G 2200/44 (2013.01); B60G 2300/082 (2013.01); B62D 9/02 (2013.01); B60G 2200/322 (2013.01)
USPC ..................................... 280/93.504

(58) Field of Classification Search
CPC .... B60G 9/02; B60G 2300/082; B60K 17/30; B62D 9/02; B62D 7/06
USPC .......................... 280/93.504, 98; 180/266, 435
See application file for complete search history.

(56) References Cited

U.S. PATENT DOCUMENTS

| 5,046,577 | A | * | 9/1991 | Hurlburt | 180/266 |
| 5,129,477 | A | * | 7/1992 | Hurlburt | 180/266 |
| 5,340,138 | A | * | 8/1994 | Hurlburt | 280/93.504 |
| 5,447,320 | A | * | 9/1995 | Hurlburt | 280/93.504 |
| 5,769,180 | A | * | 6/1998 | Momose et al. | 180/424 |
| 5,836,415 | A | * | 11/1998 | Barrowman | 180/266 |
| 6,675,925 | B2 | * | 1/2004 | Takahashi et al. | 180/266 |

FOREIGN PATENT DOCUMENTS

| CA | 2286682 | C | * | 9/2005 |
| EP | 1396358 | A2 | * | 3/2004 |
| GB | 2392657 | A | * | 3/2004 |

* cited by examiner

Primary Examiner — Paul N Dickson
Assistant Examiner — Robert A Coker
(74) Attorney, Agent, or Firm — Sue C. Watson

(57) ABSTRACT

A steering system for motor vehicles including agricultural machines is provided. The system includes a first conventional steering assembly for the front wheels to rotate only each of the front wheels within a respective first predetermined steering angle, each front wheel rotatable to a predetermined first maximum value within its pre-determined angle. The system also includes a second steering assembly to independently steer a front axle and the front wheels within a second pre-determined steering angle. The second steering assembly is activated only after each of the front wheels have reached its respective first maximum value within its first pre-determined steering angle, during the conventional steering performed by the first conventional steering assembly.

18 Claims, 12 Drawing Sheets

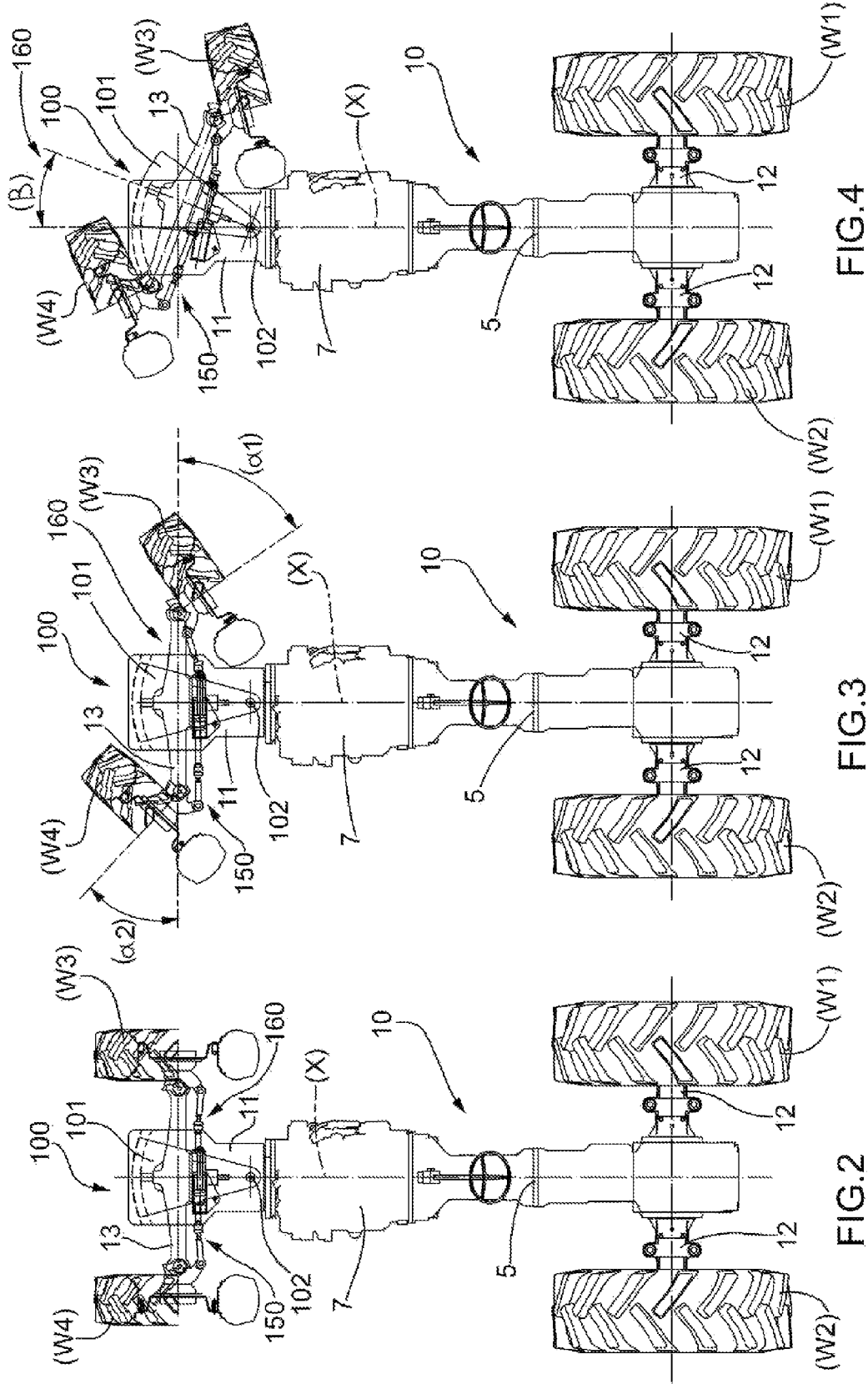

STEERING SYSTEM FOR MOTOR VEHICLES, IN PARTICULAR FOR AGRICULTURAL MACHINES

CROSS REFERENCE TO RELATED APPLICATIONS

This application is the US National Stage filing of International Application Serial No. PCT/EP2011/151324 filed on May 31, 2011, which claims priority to Italian Application Serial No. BO2010A000345 filed Jun. 3, 2012, each of which is incorporated herein by reference in its entirety for all purposes.

TECHNICAL FIELD

The present invention concerns a steering system for motor vehicles, in particular for agricultural machines.

In particular, the present invention finds an advantageous, but not exclusive, application in the field of agricultural tractors, to which the following description will explicitly refer without losing its general character.

BACKGROUND

As already known, in recent years a new steering system called SuperSteer™ has been introduced by the Applicant.

In this SuperSteer™ steering system, during the steering step, each hub relating to each front wheel rotates around its own axis, synchronically to the whole front axle, which also rotates around a pin by a determined steering angle.

This provides the tractor with an optimum manoeuvrability and with a drastically reduced turning radius.

However, the SuperSteer™ system shows some drawbacks, the main one being that, during the steering of the front wheels, the whole front axle rotates around a vertical axis. This implies a side skid of the whole tractor, which is unwelcome both at low and high speeds.

In particular, some side skids occurring during the steering at low speeds can be a problem with regard to the control of the implements coupled before or behind the tractor.

In fact, even at low speeds, said side skids, due to the SuperSteer™ steering, are rather fastidious, in particular when the tractor must operate with a certain accuracy passing among the rows of plants in vineyards and orchards, or with front loaders. In fact, the side skids could lead to unwelcome movements of the implements coupled to the tractor, thus causing the crashing of the same implements against the row posts or against the plants, with resulting relevant damages.

Therefore, the main aim of the present invention is providing a steering system for motor vehicles, in particular for agricultural machines, which is free from the aforesaid drawbacks and, at the same time, can be provided with a kind of SuperSteer™ steering effect.

More precisely, in the steering system for motor vehicles object of the present invention, the wheel steering and the front axle steering are separated and mutually independent, at least until they reach some values of the steering angles of the front wheels previously determined by the manufacturer; once these pre-determined values have been surpassed, the front axle and the wheels are synchronically steered, just like a traditional SuperSteer™.

A further aim of the present invention is providing a steering method for motor vehicles which allows to overcome the aforesaid drawbacks.

According to the present invention it is therefore realized a steering system for motor vehicles and a corresponding steering method, according to what claimed in the independent claims, or in any one of the claims directly or indirectly dependent from the independent claims.

BRIEF DESCRIPTION

In one aspect of the invention, a steering system for motor vehicles including agricultural machines is provided. The system includes a first conventional steering assembly for the front wheels to rotate only each of the front wheels within a respective first predetermined steering angle, each front wheel rotatable to a pre-determined first maximum value within its pre-determined angle. The system also includes a second steering assembly to independently steer a front axle and the front wheels within a second pre-determined steering angle. The second steering assembly is activated only after each of the front wheels have reached its respective first maximum value within its first pre-determined steering angle, during the conventional steering performed by the first conventional steering assembly.

The invention may also include a steering system wherein when the front wheels are at a position which is less than their first maximum value of their first pre-determined steering angles the first conventional steering assembly is configured to further rotate each front wheel from a minimum to the first maximum value of its first pre-determined steering angle, and when the front wheels are rotated to a position which is at the first maximum value of their pre-determined steering angles, the second steering assembly activates to simultaneously rotate the front axle between minimum and maximum values within a second pre-determined steering angle, such that the front wheels are further rotatable relative to the rotation of the front axle such that the front wheels are rotatable to a pre-determined second maximum value.

In another aspect of the invention, a steering method for motor vehicles, including agricultural machines, is provided. The method includes the step of using a first conventional steering assembly for steering front wheels of the vehicle until the front wheels reach pre-determined respective first maximum steering angles. The method also includes the step of activating a second combined steering assembly of both the front wheels and of a front axle on which the front wheels are mounted after the first pre-determined respective steering angles of the front wheels is reached. The method further includes the step of rotating the front axle along a second pre-determined steering angle, causing further rotation of the front wheels, such that the front wheels reach pre-determined second maximum steering angles.

The method may also include, in the step of activating a second combined steering assembly, activating a signal which produces activation of the second combined steering assembly of both the front wheels and of the front axle on which the front wheels are mounted.

BRIEF DESCRIPTION OF THE DRAWINGS

For a better understanding of the present invention two preferred embodiments are now described, only for exemplificative and not limitative purpose, with a reference to the enclosed drawings, wherein:

FIGS. 2, 3, 4 show a plan view of the tractor of FIGS. 1, 9 in different steering arrangements;

DETAILED DESCRIPTION

Figure 1:
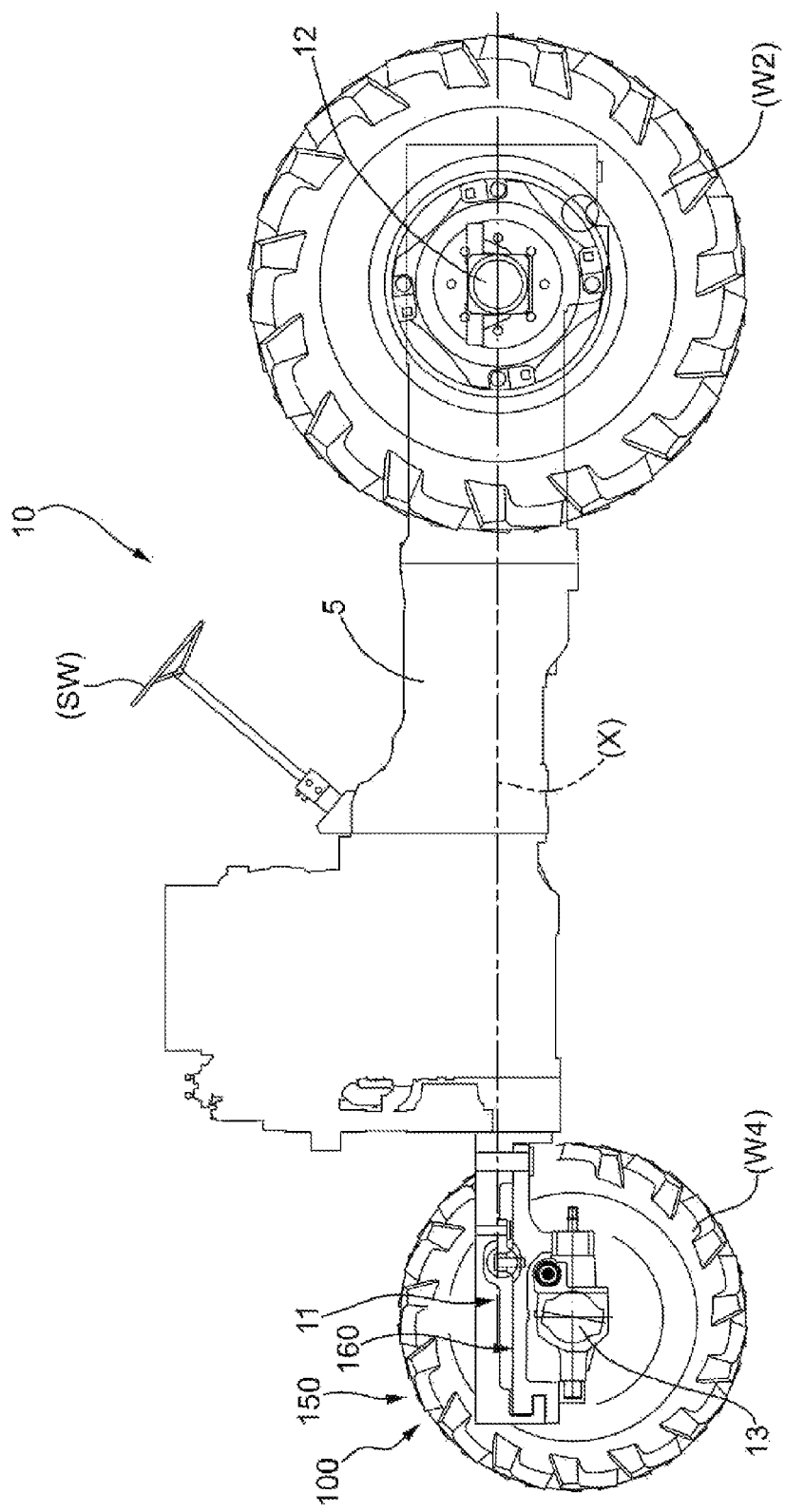
FIG. 1 shows a side view of a first embodiment of an agricultural tractor comprising a first embodiment of a steering system according to the invention.

In FIGS. 1-8 it is indicated, as a whole, a first embodiment of an agricultural machine, in particular a tractor, on which a first embodiment of a front steering system 100, which is the specific object of the present invention, is mounted.

The tractor 10 traditionally comprises a drive 5 to which a back axle 12 with two respective back wheels (W1), (W2), and a front axle 13 having two respective front wheels (W3), (W4) are associated. The drive 5 has a substantially longitudinally symmetrical axis (X).

The drive 5 is able to support also an engine 7 and a control cab (not shown) and a fixed axle support 11.

Moreover, as shown hereinafter, the steering system 100 is controlled by an operator by means of a steering wheel (SW) (FIG. 1).

The operation of the components of the first embodiment of the system 100 will be explained with explicit reference to FIGS. 2-8.

First of all, the system 100 comprises a pivoting support 101 hinged by means of a rotating pin 102 to the aforesaid fixed axle support 11. The pivoting support 101 is able to rotate around a vertical axis (Y) which is also the axis of the rotating pin 102.

The front axle 13 is associated, in a way which will be better described hereinafter, to the pivoting support 101. As previously stated, the two front wheels (W3), (W4) are mounted on said front axle 13.

Figure 5:
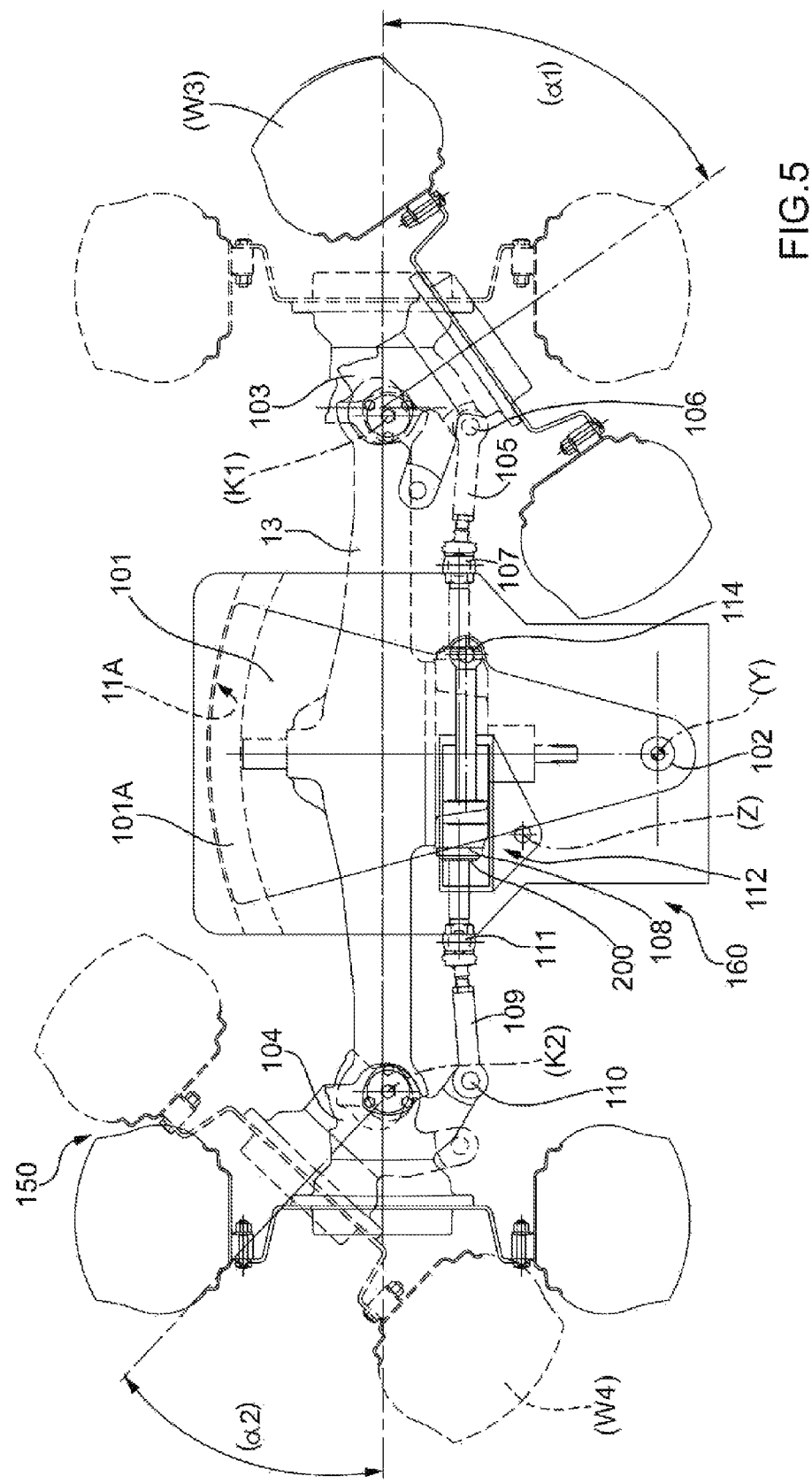
FIG. 5 shows an enlarged plan view of a front portion, in a first arrangement, of the tractor shown in FIGS. 1, 2, 3, 9.
Figure 6:
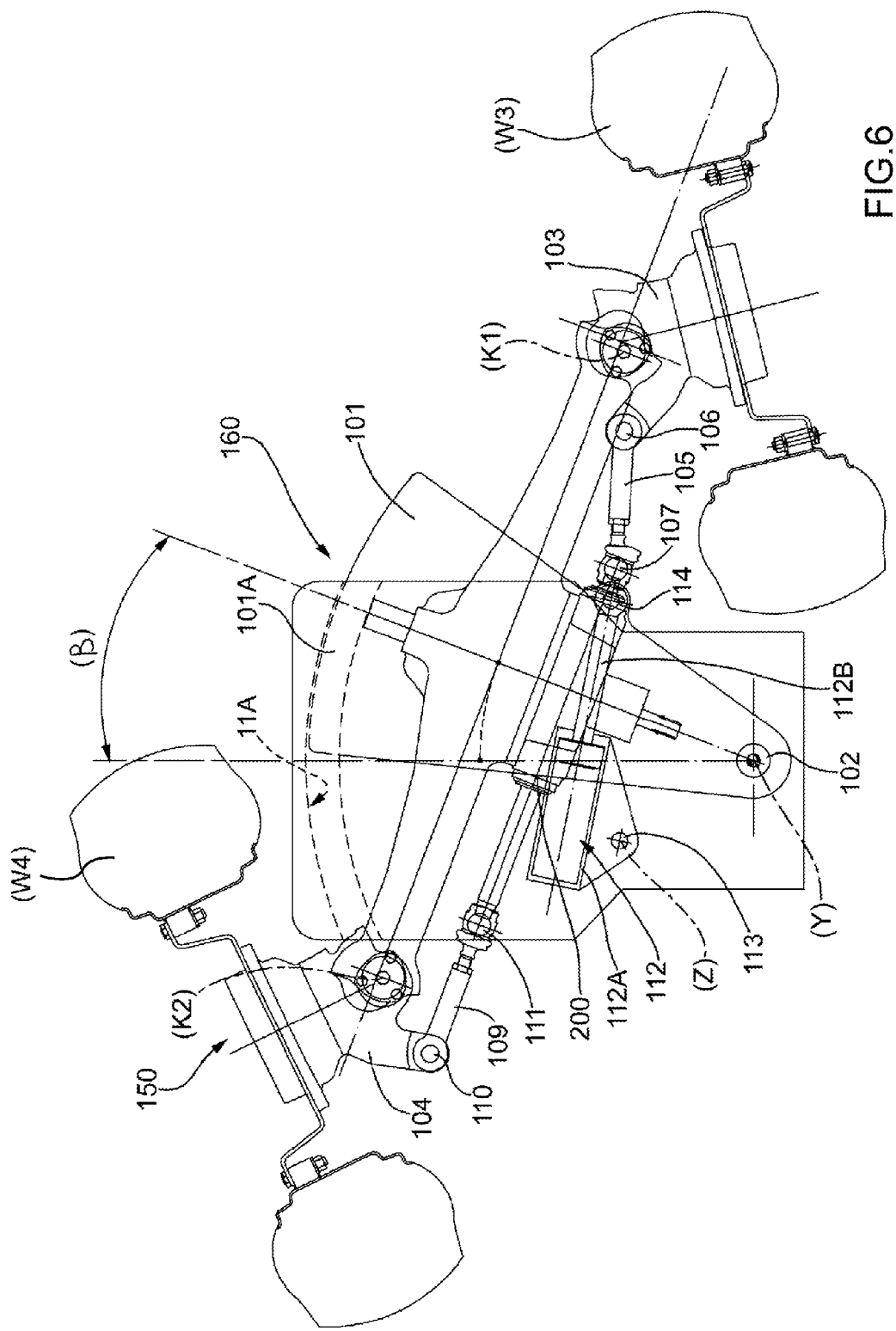
FIG. 6 shows an enlarged plan view, in a second arrangement, of the front portion shown in FIG. 4.
Figure 7:
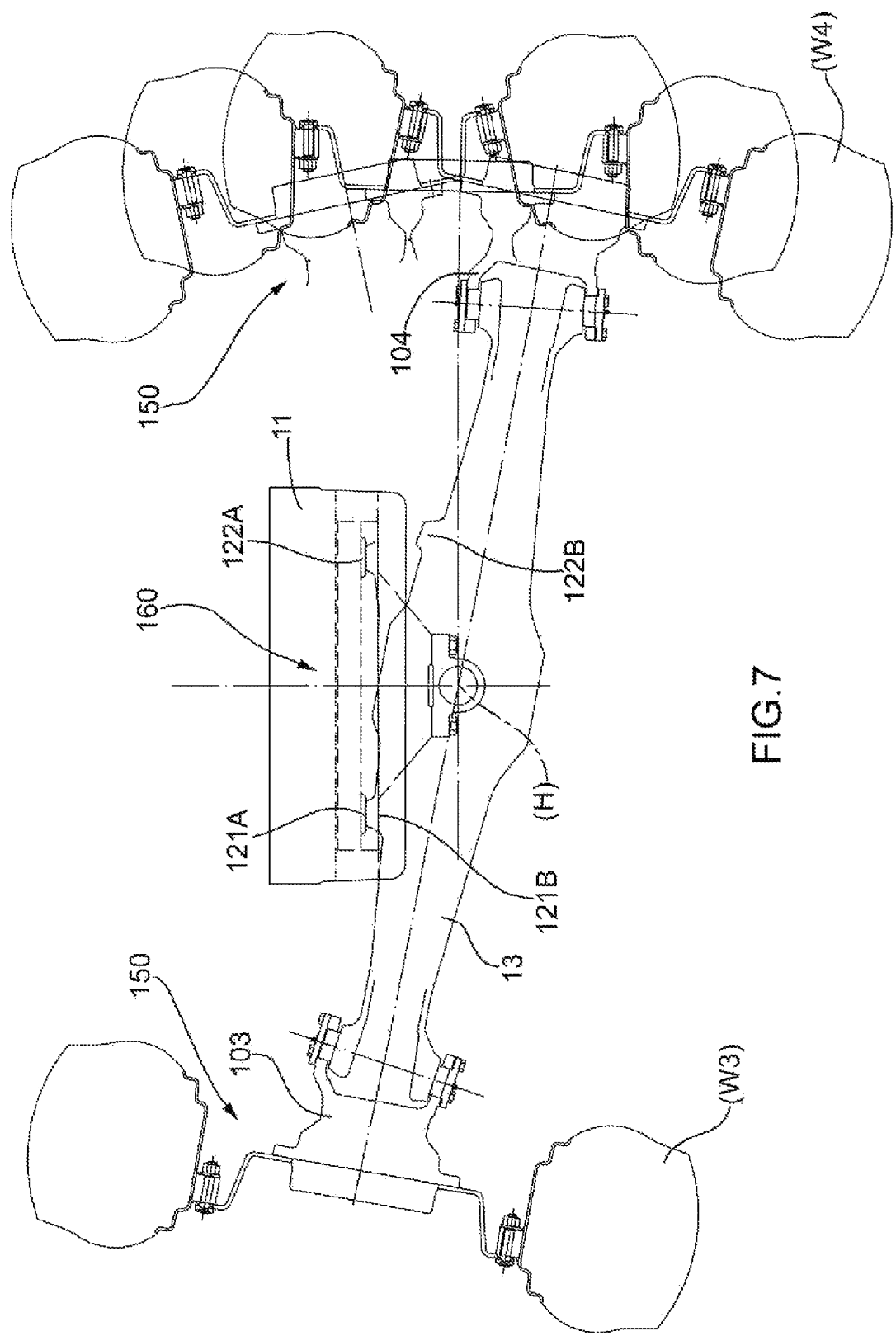
FIG. 7 shows a front view of the first embodiment of the steering system according to the invention, wherein the transversal oscillation of the front axle without suspension stands out.

As shown in more detail in FIGS. 5, 6, a hub 103, associated to the front wheel (W3), is able to rotate around a respective axis (K1).

Analogously, the hub 104 of the front wheel (W4) is able to rotate around a respective axis (K2).

The rotation of the wheel (W3) around the axis (K1), controlled by an operator by means of the steering wheel (SW) (FIG. 1), is carried out by means of an arm 105 connected to an oleodynamic actuator 200.

As shown in particular in FIGS. 5, 6, the arm 105 has a first mechanical articulation 106 with the corresponding hub 103, and a second mechanical articulation 107 with an oleodynamic piston 108 belonging to the oleodynamic actuator 200.

Analogously, the rotation of the wheel (W4) around the axis (K2) is carried out by using an arm 109 (FIGS. 5, 6), also connected to the oleodynamic actuator 200. The arm 109 is provided, in turn, with a first articulation 110 with the corresponding hub 104, and with a second mechanical articulation 111 with the oleodynamic piston 108 belonging to the oleodynamic actuator 200.

Therefore, the same oleodynamic piston 108, suitably controlled by the steering wheel (SW), on the one hand pulls the hub 103, which rotates by a certain angle ($\alpha 1$) around the axis (K1), while on the other hand pushes the hub 104 so that it rotates around the axis (K2) by an angle ($\alpha 2$) (FIG. 5).

Incidentally, as known, the two angles ($\alpha 1$), ($\alpha 2$) are different because of the locking geometry of respective hubs 103, 104 to the structure of the front axle 13.

In the example reported in FIGS. 3, 5 both rotations ($\alpha 1$), ($\alpha 2$) of the front wheels (W3), (W4) are clockwise, so that the whole tractor 10 steers to the right.

Obviously, if you wished to steer the tractor 10 to the left, the steering of the two front wheels (W3), (W4) should be counter clockwise.

Figure 8:
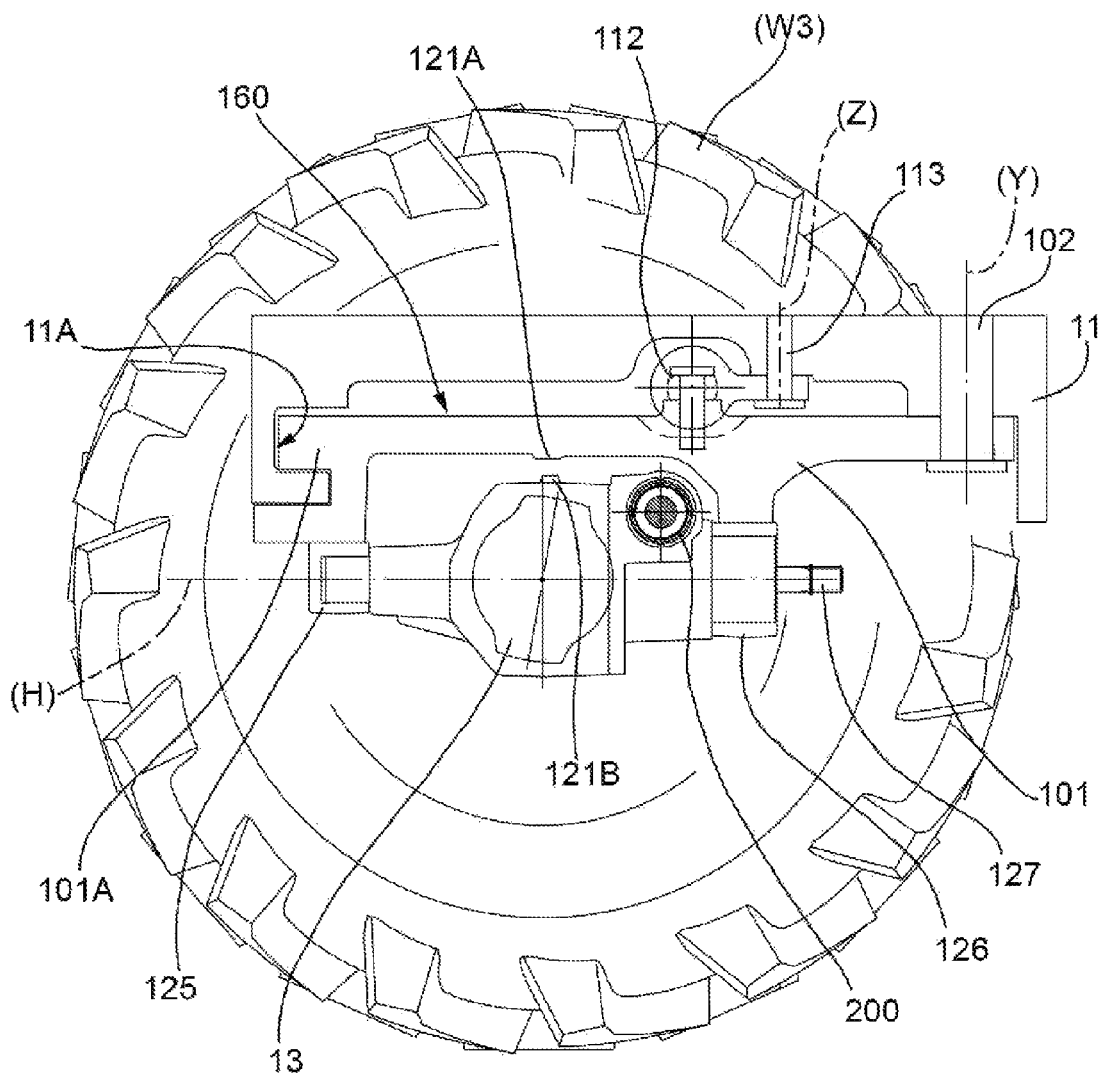
FIG. 8 shows an enlarged side view of the first embodiment of the steering system according to the invention applied to the agricultural tractor of FIG. 1.

As shown in more detail in FIG. 8 (see also FIGS. 5, 6), the pivoting support 101, which is advantageously shaped as a sector of a circle, is able to rotate around the pin 102 (having an axis (Y)) thanks to an actuator 112, preferably oleodynamic.

Moreover, the body 112A (FIG. 6) of said oleodynamic actuator 112 is hinged to the fixed axle support 11 by means of a pin 113 (having a vertical axis (Z)), whereas the free end of its shaft 112B is hinged to the pivoting support 101 by means of a hinge 114.

In other words, the actuator 112 extends between the fixed axle support 11 and the pivoting support 101, and makes the pivoting support 101 rotate around the axis (Y), thus angularly moving the pivoting support 101 with regard to the fixed axle support 11. Obviously, during the rotation of the pivoting support 101 around the axis (Y), also the body 112A of the oleodynamic actuator 112 will rotate around the axis (Z).

As shown in more detail in FIG. 8, the fixed axle support 11 has a groove 11A, shaped as an arc of a circle (see also FIGS. 5, 6), wherein a projection 101A (also shaped as an arc of a circle) of the pivoting support 101 is inserted.

In other words, the pivoting support 101 is suspended to the fixed axle support 11 by means of the pin 102 and of the coupling between the projection 101A and the groove 11A.

As always shown in FIG. 8, the front axle 13 is, in turn, suspended to the pivoting support 101 by means of two supporting braces 125, 126 projecting downward from the pivoting support 101. The support 126 is shaped so that it lets a motion propeller shaft 127 pass towards the front wheels (W3), (W4). The front axle 13 can transversally oscillate with respect to an axis (H) (FIGS. 7, 8) which is also the axis of the two supporting braces 125, 126.

Therefore, if the oleodynamic actuator 112 is operated, the pivoting support 101 rotates around the pin 102; for this reason also the front axle 13, which is suspended to the pivoting support 101, will rotate in the same way and by the same angle ($\beta$) as previously stated.

In other words, in a first step, the steering of the front wheels (W3), (W4) will be of the conventional kind until reaching an angle ($\alpha 1^*$), respectively ($\alpha 2^*$), pre-determined by the manufacturer. Once overtaken the aforesaid pre-determined values ($\alpha 1^*$), ($\alpha 2'$) of ($\alpha 1$), respectively ($\alpha 2$), a steering of the Supersteer™ kind, having an angle (β), will add to the first one (FIGS. 4, 6). When the vehicle starts to steer according to the Supersteer™ mode, also the front wheels (W3), (W4) keep synchronically rotating, thus moving from (α1*), respectively, (α2*), to a maximum value (α1max), respectively, (α2max). Incidentally, also the angle (β) varies from a value 0°, before the operation of the Supersteer™ mode, to a value (βmax).

Therefore, the "maximum obtainable total steering" will be indicated by a maximum total angle (γmax) given by the sum of the maximum angles (α1max) and (βmax), since the angle (α1) relating to the "internal wheel" (W3) with respect to the steering direction is taken as reference angle.

In this way, above all in case of moderate steering, the aforesaid unwanted side skids of the tractor are avoided because the steering is of the conventional kind. On the contrary, when a very large steering is required, the Supersteer™ steering system steps in.

In short, the first embodiment of the steering system 100 object of the present invention comprises:
 a first conventional steering assembly 150, comprising the axle 13, two hubs 103, 104 and the oleodynamic actuator 200 to directly steer the hubs 103, 104;
 and a second Supersteer™ steering assembly 160, comprising the pivoting support 101, hinged to the fixed axle support 11, and an oleodynamic actuator 112 to rotate the pivoting support 101 with regard to the fixed axle support 11 around a pin 102; the second steering assembly 160 being able to support also the axle 13 which rotates together with the pivoting support 101.

As previously stated, the second Supersteer™ steering assembly 160 is operated only after that a conventional steering of the front wheel (W3), (W4) having pre-determined values (α1*), respectively, (α2') has been carried out by means of the first conventional steering assembly 150.

In a first possibility, (α1*)<(α1max), and (α2*)<(α2max) such that both steering assemblies 150, 160 move simultaneously the front wheels (W3), (W4) from (α1*), (α2') to, respectively, (α1max*), (α2max).

In a second possibility, (α1*)=(α1max), and (α2*)=(α2max) with a subsequent action of the Supersteer™ steering assembly 160 only once achieved angles (α1max) and (α2max) by using the conventional steering assembly 150 only.

Therefore, the steering method for motor vehicles, which is the further object of the present invention, comprises:
 a first normal steering step having pre-determined angles (α1*), (α2*); followed by
 a second Supersteer™ steering step having an angle (β), whereas the angles (α1), (α2) vary from initial values (α1*), respectively, (α2*) to final values (α1max), respectively, (α2max).

In other words, after having reached the pre-determined conventional steering values (α1*), (α2*), it is produced a signal which allows a further steering by an angle (β) by means of a Supersteer™ steering, and the completing of (α1), (α2) until reaching the maximum values (α1max), (α2max).

The signal which allows a further steering by an angle (β) can be generated by sensors (not shown), e.g. allocated on the hubs 103, 104, and processed by an electronic processor (not shown). In other words, such sensors are able to detect instant by instant the effective values of the angles (α1), (α2) for generating a signal when the values (α1*), (α2*) have been reached. Moreover, the manufacturer has the possibility to set the values of the angles (α1*), (α2*) by using a conventional controller (not illustrated) before the sale of the tractor.

Obviously, the return steering to a rectilinear position is carried out by the Supersteer™ steering system 160 by means of a 0° value return of angle (β), and of a return of the angles (α1), (α2) from the maximum values (α1max), respectively, (α2max) to values (α1*), respectively (α2*). Such step is followed by a further step wherein a return of the angles (α1), (α2) to 0° value is achieved by using the conventional steering system 150 of the front wheels (W3), (W4).

Figure 9:
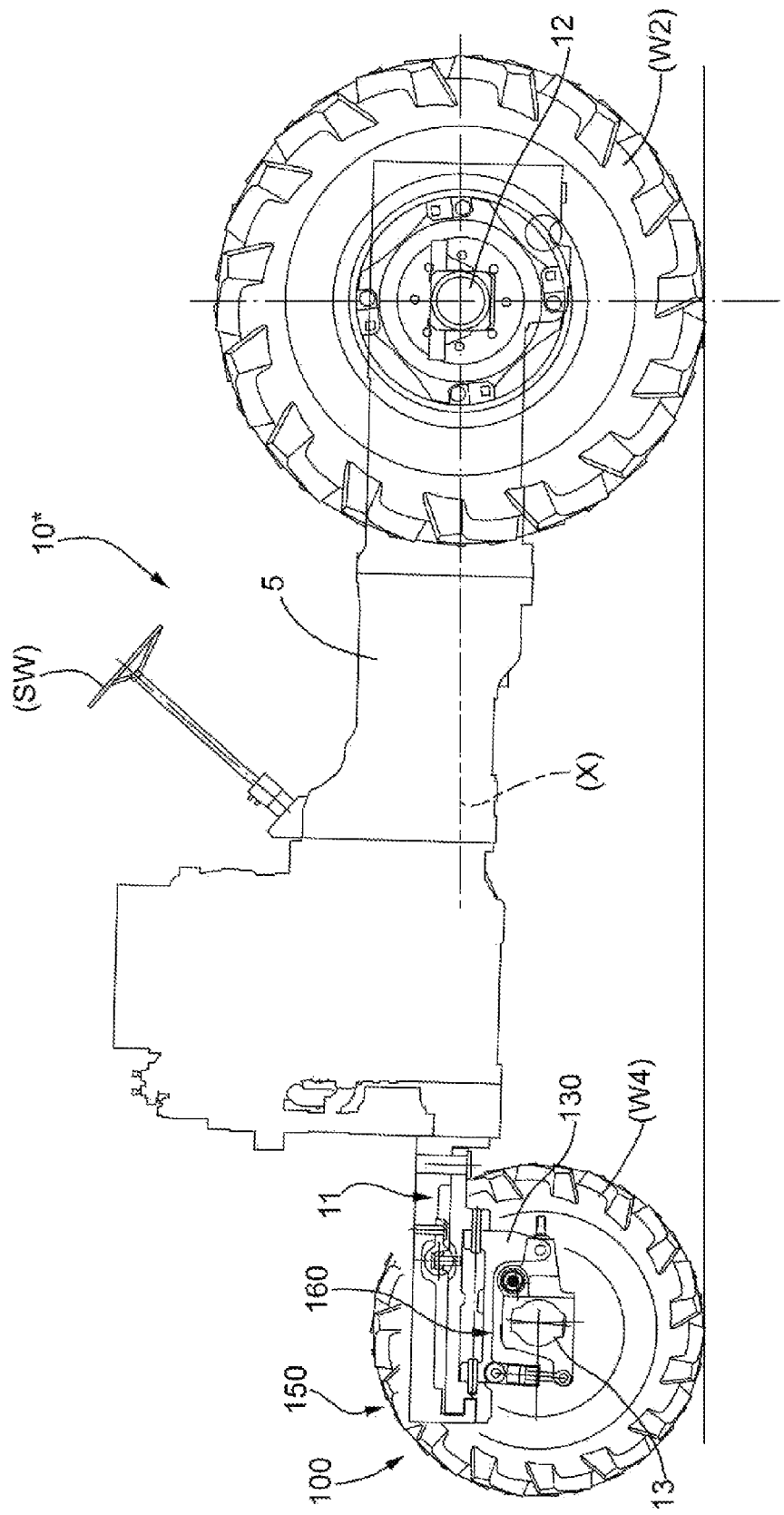
FIG. 9 shows a side view of a second embodiment of an agricultural tractor comprising a second embodiment (with suspension) of a steering system according to the invention.

According to a second embodiment of the present invention, the front axle 13 of a tractor 10* is of the suspended kind (FIG. 9). This second embodiment will be described hereinafter with a reference to FIGS. 2-6, 9-14, wherein the same reference numbers have been used for the components belonging to both embodiments.

As shown in particular in FIGS. 10, 11 the second embodiment differs from the first one because of the presence of an oscillating intermediate support 130 of the axle 13; this intermediate axle 130 belongs to a shock-absorbing apparatus 120, which will be described hereinafter.

Figure 10:
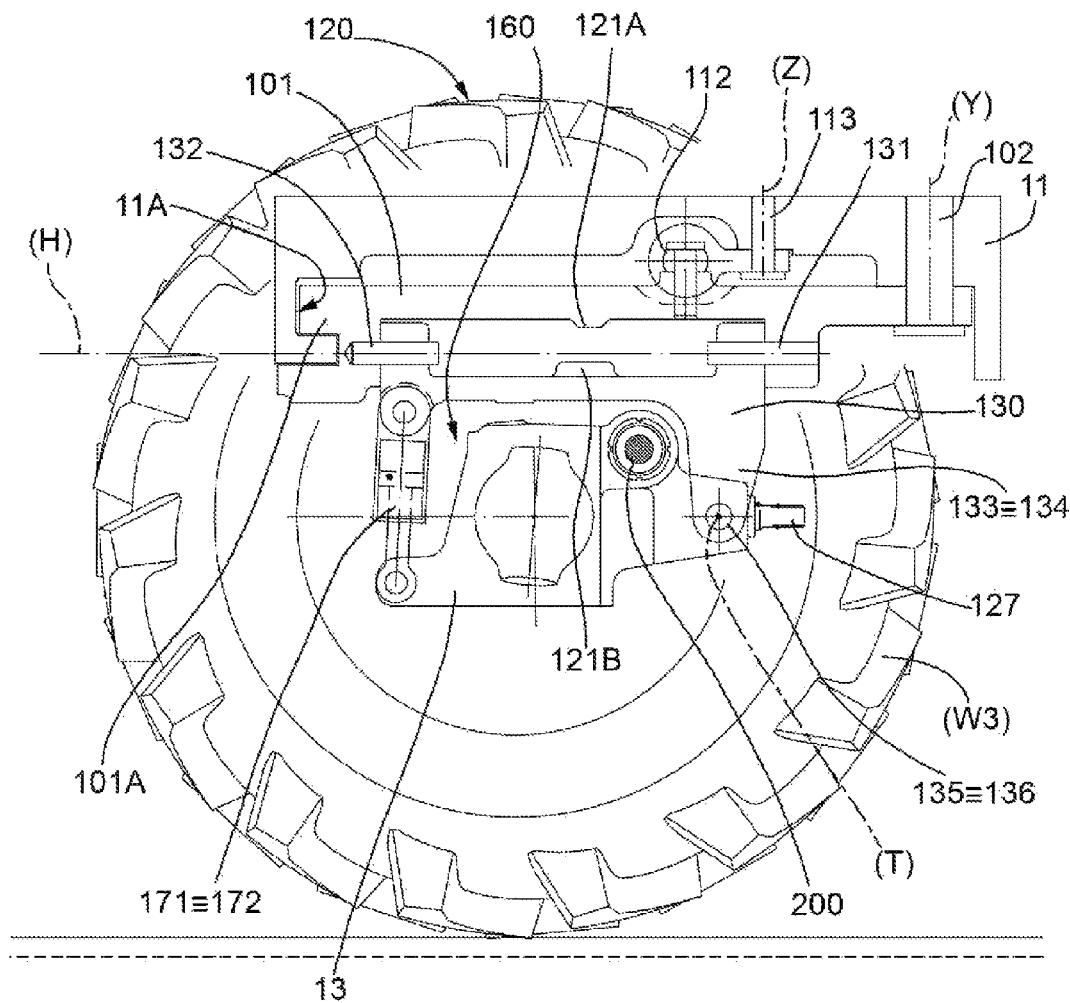
FIG. 10 shows an enlarged side view of the second embodiment of the steering system according to the invention shown in FIG. 9.
Figure 11:
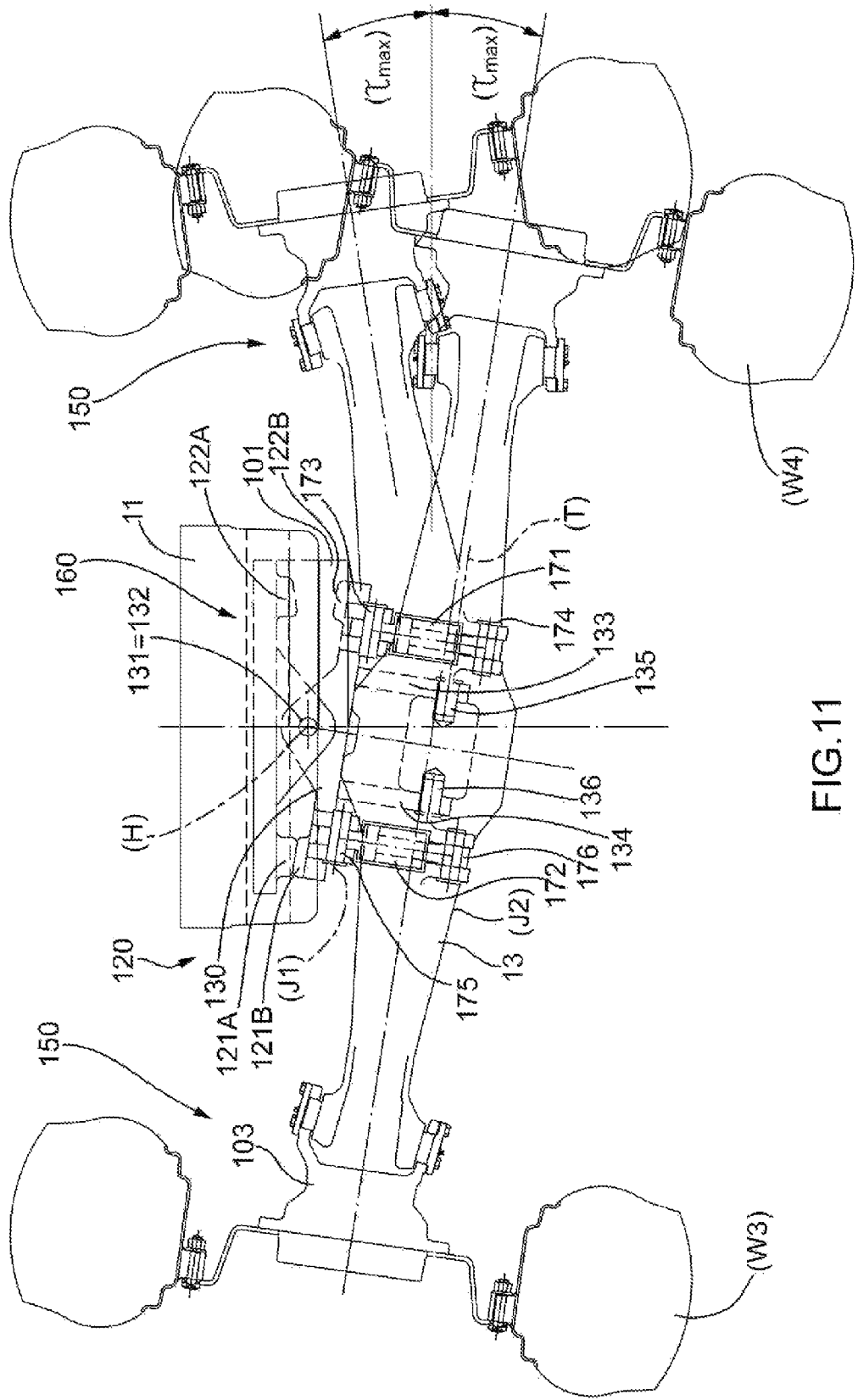
FIG. 11 shows a front view of the second embodiment of the steering system according to the invention, wherein the transversal oscillation of the front axle with suspension stands out.

The oscillating intermediate support 130 is suspended to the pivoting support 101 by means of two pins 131, 132 having an axis (H) (FIGS. 10, 11).

The oscillating intermediate support 130 is provided with two ears 133, 134 (FIG. 11), each of them being mechanically coupled to the back (or front) part of the front axle 13 by means of a respective pin 135, 136 (having an axis (T)).

As shown in FIGS. 10, 11 two shock-absorbing cylinders 171, 172 are arranged between the oscillating intermediate support 130 and the front (or back) part of the front axle 13; but also a mono-cylinder system can be used (not shown).

The shock-absorbing cylinder 171 is hinged to the oscillating intermediate support 130 by means of a pin 173 (having an axis (J1)), and to the front axle 13 by means of a pin 174 (having an axis (J2)).

Analogously, the shock-absorbing cylinder 172 is hinged to the oscillating intermediate support 130 by means of a pin 175 (having an axis (J1)) and to the front axle 13 by means of a pin 176 (having an axis (J2)).

In use, when the pivoting support 101 rotates around the pin 102 (having an axis (Y)), also the oscillating intermediate support 130 and the front axle 13, which are both suspended to the pivoting support 101, will rotate by the same angle. At the same time, the front axle 13 is also cushioned thanks to the presence of the two front (or back) shock-absorbers 171, 172 allowing the oscillation of the front axle 13 around the two pins 135, 136 (FIGS. 10-14).

As always shown in FIG. 11, a transversal oscillation angle (τ) is formed between the axle 13 and the pivoting support 101.

In order to limit the width of the transversal oscillation angle (τ) to a pre-determined maximum value (τmax), between the pivoting support 101 and the oscillating intermediate support 130, two pairs of end elements 121A, 121B are provided, on the one side with respect to the axis (H), and 122A, 122B, on the other side (always with respect to the axis (H)). The manufacturer, suitably adjusting the height of the pairs of end elements 121A, 121B, respectively, 122A, 122B, imposes a certain pre-determined maximum transversal oscillation angle (τmax) of the axle 13, so that the motor vehicle cannot bend too much laterally, in order to avoid any situation wherein the motor vehicle can be turned over. The advantage of the described situation is that the maximum transversal oscillation angle (τmax) between the pivoting support 101 and the oscillating intermediate support 130 is independent with respect to the vertical position of the suspension and with respect to the steering angles (α1), (α2) of the front wheels (W3), (W4).

In other words, the maximum value (τmax) of the transversal oscillation (τ) of the front axle 13 is independent from the relative position between the oscillating intermediate support 130 and the front axle 13.

Moreover, the maximum value (τmax) of the transversal oscillation (τ) of the front axle 13 is independent from the steering angles (α1), (α2) of the front wheels (W3), (W4).

Figure 12:
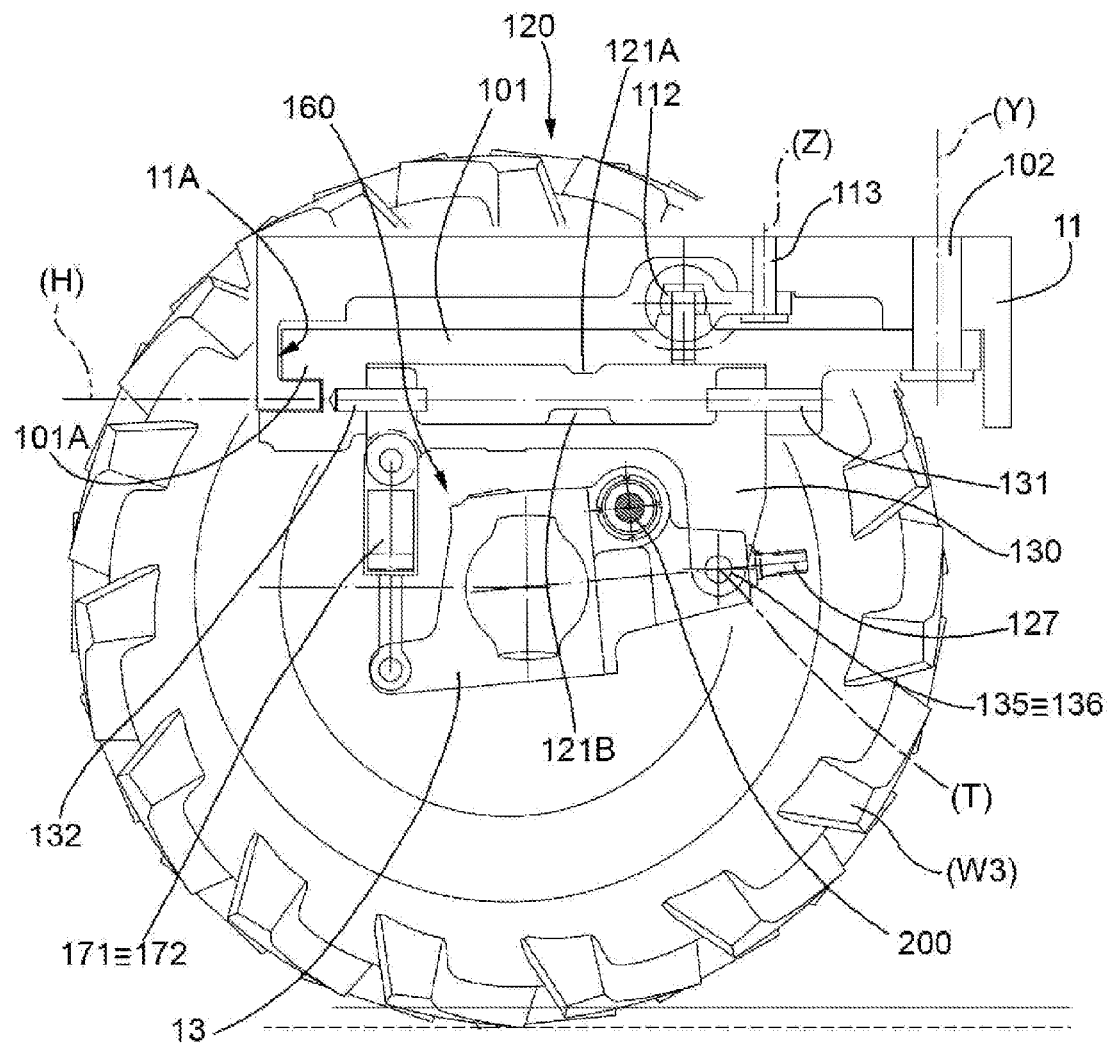
FIG. 12 shows an operating position of "maximum elevation" of a suspension comprised in the second embodiment of the steering system according to the invention.
Figure 13:
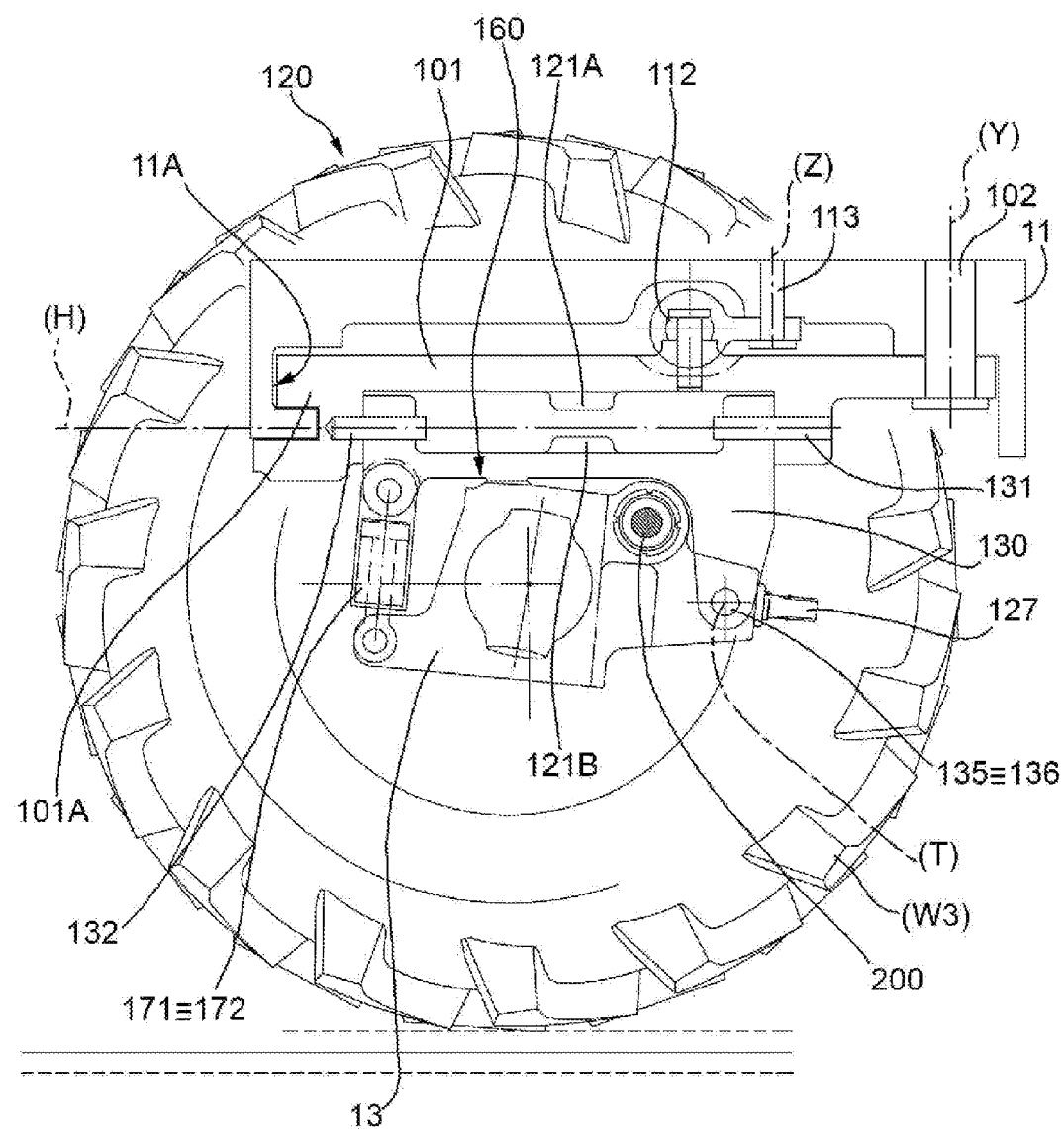
FIG. 13 shows an operating position of "minimum lowering" of a suspension comprised in the second embodiment of the steering system according to the invention.

In order to better illustrate the operation of the second embodiment of the present invention, FIG. 12 shows the operating position of "maximum elevation" and FIG. 13 shows the operating position of "minimum lowering" of the shock-absorbing cylinders 171, 172.

Figure 14:
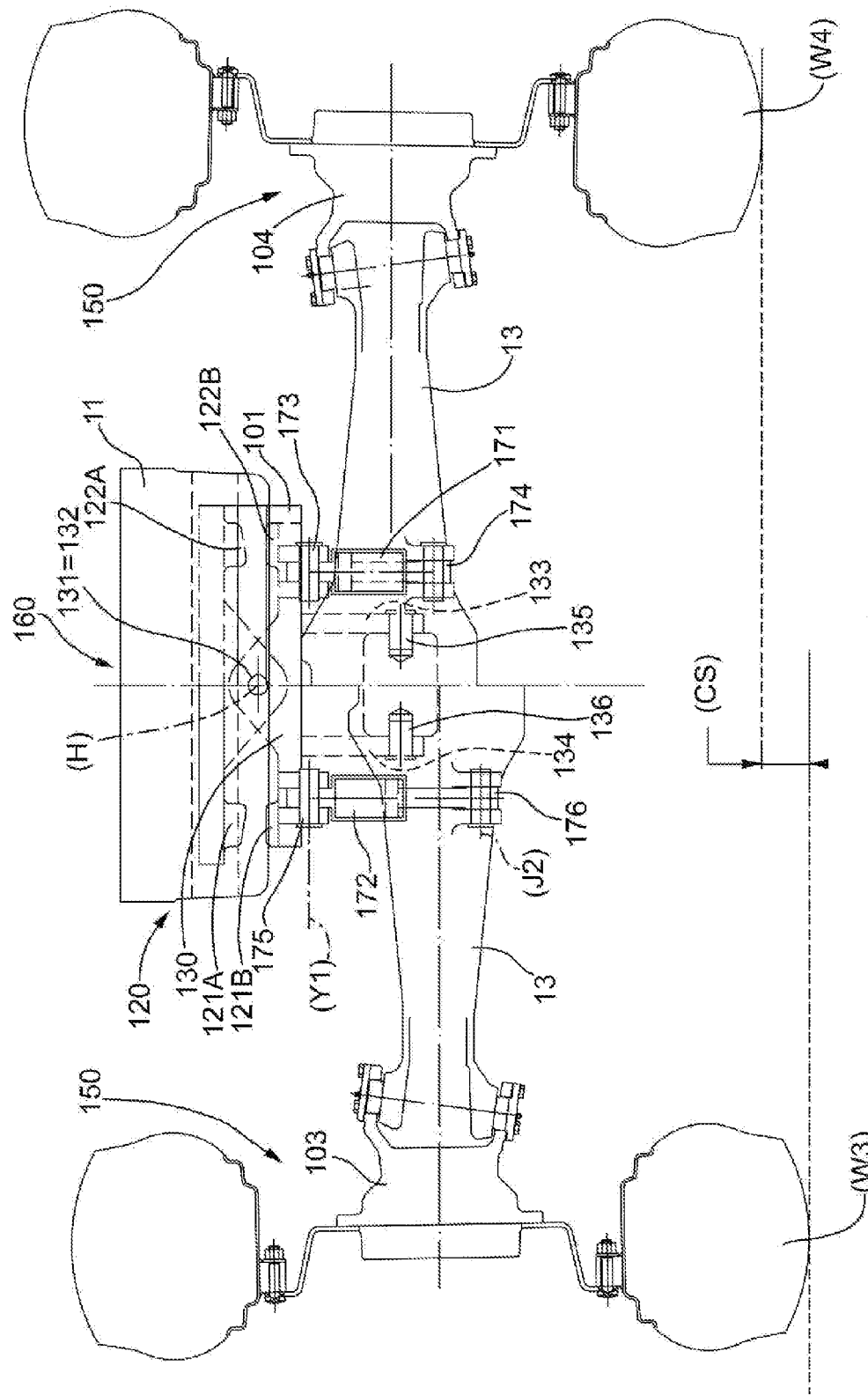
FIG. 14 shows the maximum stroke of the suspension comprised in the second embodiment of the steering system according to the invention.

Furthermore, FIG. 14 shows the maximum stroke (CS) of the shock-absorbing apparatus 120, wherein the front wheels (W3), (W4) take the absolute lowest, respectively highest, position. The stroke (CS) of the shock-absorbing apparatus 120 will therefore be given by the distance between the highest and the lowest position between the two wheels (W3), (W4).

The main advantage of the system, and of the corresponding method according to the present invention, is represented by the fact that with limited steering angles the steering system behaves like a normal system, therefore without implying side skips of the tractor. By increasing the steering angle of the tractor, for instance at the head-land, wherein a possible small side skip of the tractor would have no relevance, a Supersteer™ steering system, which remarkably increases the steering capacity of the tractor, is inserted in series.

Moreover, when the system according to the present invention is of the suspended kind, it can have the advantages of a dampened axle which avoids, at high speeds, the pitching of the tractor, above all during the road transport.

The invention claimed is:

1. A steering system for motor vehicles including agricultural machines, comprising:
    a first conventional steering assembly for the front wheels to rotate only each of the front wheels within a respective first pre-determined steering angle, each front wheel rotatable to a pre-determined first maximum value within its pre-determined angle, and
    a second steering assembly to independently steer a front axle and the front wheels together within a second pre-determined steering angle,
the second steering assembly being activated only after each of the front wheels have reached its respective first maximum value within its first pre-determined steering angle, during the conventional steering performed by the first conventional steering assembly.

2. The steering system of claim 1, wherein when the front wheels are at a position which is less than their first maximum value of their first pre-determined steering angles, the first conventional steering assembly is configured to further rotate each front wheel from a minimum to the first maximum value of its first pre-determined steering angle, and when the front wheels are rotated to a position which is at the first maximum value of their pre-determined steering angles, the second steering assembly activates to simultaneously rotate the front axle between minimum and maximum values within a second pre-determined steering angle, such that the front wheels are further rotatable relative to the rotation of the front axle such that the front wheels are rotatable to a pre-determined second maximum value.

3. The steering system of claim 1, wherein the steering system further comprises a shock-absorbing apparatus.

4. The steering system of claim 1, wherein
    the first conventional steering assembly comprises the front axle, two front hubs and first actuating means to directly steer the hubs; and
    the second steering assembly comprises a pivoting support hinged to a fixed axle support, and second actuating means to rotate the pivoting support around a pin relative to the fixed axle support, the second steering assembly also configured to support the axle rotating together with the pivoting support.

5. The steering system of claim 4, wherein the pivoting support is shaped as a sector of a circle and it is configured to rotate around the pin because of the second actuating means.

6. The steering system of claim 4, wherein a body of the second actuating means is mechanically hinged to the fixed axle support, and wherein a free end of a shaft of the second actuating means is mechanically hinged to the pivoting support.

7. The steering system of claim 6, wherein the fixed axle support has a groove shaped as an arc of a circle, in which a projection of the pivoting support is inserted.

8. The steering system of claim 7, wherein the front axle, in turn, is suspended to the pivoting support by means of supporting braces projecting from the pivoting support.

9. The steering system of claim 7, further comprising a shock-absorbing apparatus including an oscillating intermediate support of the front axle.

10. The steering system of claim 9, wherein the oscillating intermediate support is coupled to the pivoting support by means of two pins.

11. The steering system of claim 10, wherein the oscillating intermediate support is provided with two ears, each ear being mechanically coupled to a back or a front part of the front axle by one of the pins.

12. The steering system of claim 11, wherein two pairs of end elements are arranged between the pivoting support and the oscillating intermediate support in order to limit a width of a transversal oscillation angle of the front axle to a pre-determined maximum value.

13. The steering system of claim 12, wherein the maximum value of the transversal oscillation of the front axle is independent from a relative position between the oscillating intermediate support and the front axle.

14. The steering system of claim 12, wherein the maximum value of the transversal oscillation of the front axle is independent from the first pre-determined steering angles of the front wheels.

15. The steering system of claim 14, wherein at least a shock-absorbing cylinder is placed between the oscillating intermediate support and the front part of the front or back axle.

16. The steering system of claim 15, wherein the steering system further comprises at least a sensor which is configured to detect instant by instant the effective values of the first pre-determined steering angles for generating a signal when the first maximum values of the first pre-determined steering angles have been reached in order to allow a further steering within the second pre-determined steering angle of both the front axle and the front wheels such that the front wheels are rotatable to a pre-determined second maximum value.

17. A steering method for motor vehicles including agricultural machines, the method comprising:
    using a first conventional steering assembly for steering front wheels of the vehicle until the front wheels reach pre-determined respective first maximum steering angles;
    activating a second combined steering assembly of both the front wheels and of a front axle on which the front wheels are mounted after the pre-determined respective first maximum steering angles of the front wheels is reached; and rotating the front axle along a second pre-determined steering angle, causing further rotation of the front wheels, such that the front wheels reach pre-determined second maximum steering angles.

18. The steering method of claim 17, wherein the step of activating the second combined steering assembly includes activating a signal which produces activation of the second combined steering assembly of both the front wheels and of the front axle on which the front wheels are mounted.

* * * * *